United States Patent [19]

Gailbreath et al.

[11] Patent Number: 4,987,514

[45] Date of Patent: Jan. 22, 1991

[54] METHOD AND APPARATUS FOR PREVENTING PARASITIC ELECTRICAL DISCHARGES IN MAGNETIC DISK DRIVES

[75] Inventors: Samuel H. Gailbreath; Boyd N. Shelton; Richard L. Hilton, all of Boise, Id.

[73] Assignee: Hewlett-Packard Company, Palo Alto, Calif.

[21] Appl. No.: 311,486

[22] Filed: Feb. 15, 1989

[51] Int. Cl.$^5$ .......................... G11B 5/40; H05F 1/00; H05F 3/00; H05F 3/02

[52] U.S. Cl. .................................. 361/220; 361/212; 369/72; 369/126

[58] Field of Search .......................... 361/212, 220–225, 361/230, 231, 2, 4, 6; 369/72, 73, 74, 126; 307/326, 327

[56] References Cited

U.S. PATENT DOCUMENTS

| | | | |
|---|---|---|---|
| 3,868,550 | 2/1975 | Knauer et al. | 361/4 |
| 4,459,691 | 7/1984 | Yamada | 369/126 |
| 4,585,963 | 4/1986 | Wilkinson, Jr. et al. | 310/67 R |
| 4,623,952 | 11/1986 | Pexton | 361/220 |
| 4,670,663 | 6/1987 | Fancher | 307/113 |

Primary Examiner—A. D. Pellinen
Assistant Examiner—David Osborn

[57] ABSTRACT

A method and apparatus for operating a magnetic disk drive having a pole piece spaced apart from a magnetic disk surface by a predetermined distance to effectively form two plates of a parasitic capacitance capable of sustaining an undesirable electrical discharge capable of destroying data on the disk either by random discharge between the pole piece and magnetic disk or by discharge into imperfections on the disk. The invention comprises a circuit and method for applying a DC voltage to the pole piece and for simultaneously applying a DC voltage to the magnetic disk surface which is approximately equal to the DC voltage applied to the pole piece and thereby preventing the above parasitic capacitance between the pole piece and the magnetic disk surface from charging to a level sufficient to sustain any electrical discharge.

1 Claim, 1 Drawing Sheet

METHOD AND APPARATUS FOR PREVENTING PARASITIC ELECTRICAL DISCHARGES IN MAGNETIC DISK DRIVES

FIELD OF THE INVENTION

This invention relates generally to electrical protection circuitry for magnetic disk drives and more particularly to such circuitry which is operable to prevent the unwanted parasitic electrical discharge between a read/write head and a magnetic disk to which it is coupled.

BACKGROUND ART

In conventional sensing and electronic drive circuitry for connection to and operation with the read/write heads of magnetic disk drives, the magnetic core of the head is magnetically coupled to and insulated from a winding which in turn is connected to an amplifier. The amplifier is adapted to either amplify read signals taken from a magnetic disk or to amplify write signals applied to the read/write head of the disk drive. The winding is typically insulated from the other elements of the read/write head by a polymer, such as a photoresist, which will have a resistance typically on the order of 1000 Megohms. As is well known, the read/write head is positioned closely adjacent to the surface of the magnetic disk surface, and these closely spaced devices form two plates of a parasitic capacitance. This parasitic capacitance may thus be charged with a current drawn through the resistance of the above insulating material located between the winding and the other elements of the read/write head.

The problem caused by the above parasitic RC circuit is that the charged parasitic capacitance will frequently discharge during a read operation of the disk drive and thereby produce an error in the read data. This discharge takes place in either one of two modes. In one mode, the discharge takes place randomly over the surface of the disk, in which case it has been referred to as an "electrical storm". In the other mode, the discharge will take place repeatedly at a surface irregularity on the disk every time the irregularity passes underneath the read/write head. The latter mode has been referred to as the "Hilton effect".

Prior efforts have been made to solve this problem and they involve reducing the DC bias applied to the above described amplifier in order to reduce the DC voltage across the head-to-disk surface parasitic capacitance. However, this approach has not proven satisfactory because of the DC biasing levels required for normal and acceptable amplifier operation with magnetic disk drives where only positive voltage supplies are available.

SUMMARY OF INVENTION

It is an object of the present invention to eliminate the above problem of electrical discharge between the read/write head and the magnetic disk surface of a magnetic disk drive. This object is achieved by biasing the magnetic disk surface to the same or approximately the same DC voltage level as is applied to the winding of the read/write head. Thus, in this manner both "plates" of the above parasitic capacitance between the magnetic disk surface and the read/write core are at the same DC voltage level, and no charging of this parasitic capacitance is now possible.

Therefore, the claims according to the present invention for preventing the above described undesirable electrical discharge between the read/write head and its associated magnetic disk involve a means and method for applying a DC voltage to the disk surface which is approximately equal to the DC voltage applied to the windings of the read/write head, and this action in turn prevents the above parasitic capacitance from ever charging.

The invention described herein has a wide application and utility in many different types of disk drives, and has been found to be particularly useful on the Hewlett Packard 760 megabyte —5¼ inch fixed disk drive known as the model no. HP9754X disk drive.

DETAILED DESCRIPTION

Figure 1:
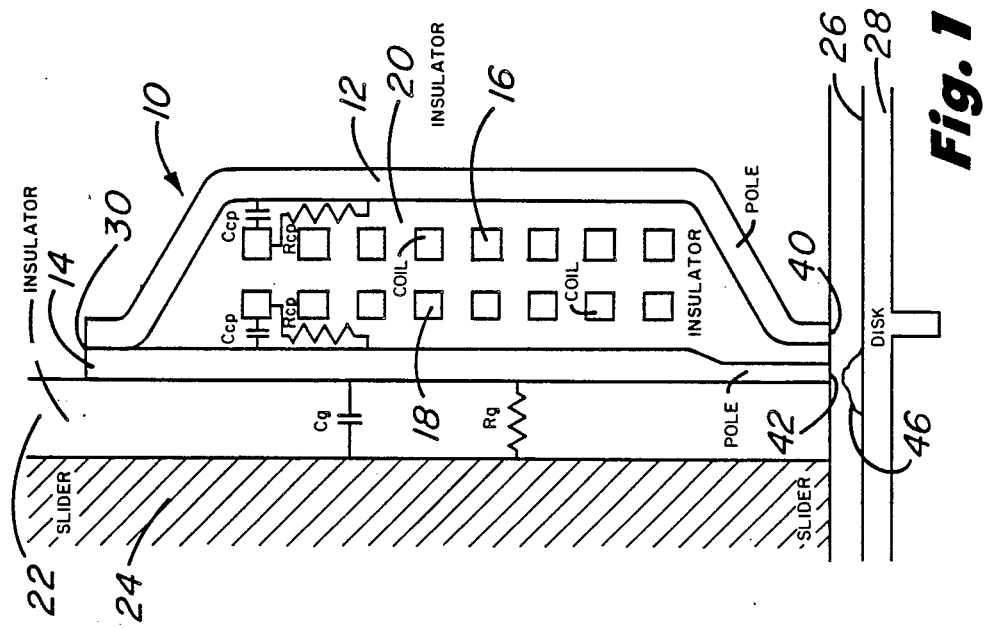
FIG. 1 is a cross-section view of a magnetic core read/write head assembly shown adjacent to a magnetic disk surface to which it is magnetically coupled.

Referring now to FIG. 1, the magnetic head is designated generally as 10 and includes typically a pair of outer magnetic pole pieces 12 and 14 connected in the configuration shown to surround two layers of coils 16 and 18. These two layers of coils 16 and 18 are insulated from each other and from the outer core members 12 and 14 by an insulating material 20 which will typically be a polymer material such as photoresist. The head member 10 also includes an insulating layer 22 which supports the pole piece 14 and which in turn is disposed on a slider 24 used for moving the head 10 from location to location across the surface 26 of a magnetic layer 28. The two pole pieces 12 and 14 are bonded together at the interface region 30.

Within the insulating material 20 of the magnetic read/write head 10 there is a parasitic coil-to-pole capacitance, designated $C_{cp}$, and a parasitic resistance, $R_{cp}$, as indicated in FIG. 1. The insulating layer 22 will also possess a parasitic capacitance, $C_g$, and a parasitic resistance, $R_g$, as indicated in FIG. 1, and these parasitic values of resistance and capacitance are shown in equivalent circuit form in FIG. 2 together with $R_{cp}$ and $C_{cp}$. The read/write head 10 in FIG. 1 as well as a magnetic disk to which it is coupled may be fabricated using processes known to those skilled in the art. Such processes are disclosed, for example, in the *Hewlett-Packard Journal*, Vol. 36, No. 11, November 1985, incorporated fully herein by reference.

Figure 2:
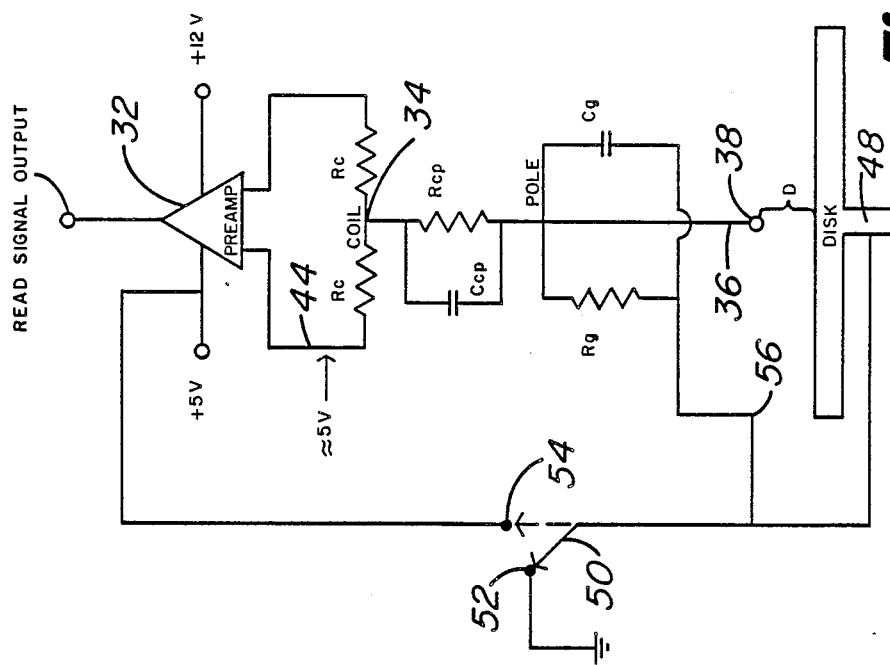
FIG. 2 is an electrical equivalent circuit for the magnetic head assembly of FIG. 1.

Referring now to FIG. 2, the two parameters $R_c$ indicate the resistance of the two layers 16 and 18 of coil in the head 10 and will each typically have a value on the order of 7.5 ohms. These coils are connected as shown to a read preamplifier 32 which operates to provide a read signal output and will be normally biased with two positive DC voltage supplies, one of +5 volts and another of +12 volts. The center point 34 between the two parasitic coil resistances $R_c$ is connected to another parasitic resistance $R_{cp}$ and to a parasitic capacitance $C_{cp}$ which are the parasitic resistance and capacitance respectively of the coil-to-pole resistance and capacitance previously indicated in FIG. 1. $R_{cp}$ will typically be about 1000 Megohms and the capacitance $C_{cp}$ will typically be about 0.05 picofarads. These latter parasitic resistance and capacitance elements are connected as shown to the parasitic resistance $R_g$ and the parasitic capacitance $C_g$ of the insulating layer 22 which is aluminum oxide. $R_g$ will typically be about 10,000 Megohms and parasitic capacitance $C_g$ will typically be about 0.1 picofarad.

The conductor 36 in the equivalent circuit of FIG. 2 has a floating terminal 38 which corresponds electrically to the read/write surfaces 40 and 42 of the read/write head 10 in FIG. 1. These surfaces 40 and 42 and their electrical equivalent terminal 38 in FIG. 2 will typically be located about 7 to 10 microinches above the adjacent surface 26 of a magnetic disk 28. This distance D thus represents the spacing between two plates of a parasitic parallel plate capacitance which may be discharged as indicated above by the electrical storm effect or by the Hilton effect during operation of a disk drive. The +5 volt DC supply necessary for properly biasing the preamplifier 32 is approximately the same voltage as is seen on the input conductor 44 connected to the preamplifier 32 and also appearing at the terminal 38 in the equivalent circuit of FIG. 2. This is the voltage to which the 0.1 picofarad capacitor $C_g$ charges during a magnetic head read operation when the disk 48 is grounded.

The undesirable electrical discharge of capacitance $C_g$ which occurs between the ends 40 and 42 of the pole pieces 12 and 14 of the read/write head 10 and the disk surface 26 are believed to be caused by two different types of electrical discharge effects. The first of these effects is a dielectric breakdown of the air in the space D between the ends 40 and 42 of the pole pieces 12 and 14 and the adjacent facing surface 26 of the disk 28. This discharge may occur at an irregularity on the disk surface 26 which may be seen as a bump or protrusion 46 or at any other area on the surface 26 where the electrical field intensity is sufficiently high. This dielectric breakdown is caused by the ionization of air between the ends 40 and 42 of the pole pieces 12 and 14 and the surface 26 of the disk 28. This ionization of air in turn provides a very low resistance path for current to flow between plates of the above described parasitic parallel plate capacitance.

The second of the two electrical discharge effects thought to occur between the parasitic parallel plate capacitance is that of a field emission where electrons are literally stripped off of the air molecules within the space D when the electrical field gradient or intensity within the space D exceeds a given threshold. This given threshold will typically be in the range of $10^6$ to $10^7$ volts per meter, and as an example, a voltage of 5 volts DC bias on the amplifier 32 divided by a distance D of 0.2 microns between the bump 40 and the pole ends 40 and 42 would yield a field strength of $25 \times 10^6$ volts per meter. This value is substantially in excess of the $10^6$ to $10^7$ volts per meter threshold level as previously indicated. In either case, however, these undesirable electrical discharges are coupled as spurious AC signals back up through the preamplifier 32 when the spindle 48 and associated disk 28 are connected to ground in the prior art practive as indicated by the ground connection position of the switch 50. These amplified spurious signals thus appear in the read signal output of the preamplifier 32 and are further amplified and processed to yield erroneous data and unwanted noise in the amplified read output signal.

However, in accordance with the present invention, the ground connection of the switch 50 has been removed from the ground connection position 52 and moved to the +5 volt position 54 as shown in FIG. 2. In this position, the spindle 48 is now biased to the +5 volt positive supply potential which is connected to the preamplifier 32. This connection in turn leaves the pole face equivalent terminal 38 at the same potential as the surface 26 of the disk 28 and thus makes it impossible for the parasitic capacitance between node 38 and disk surface 28 from ever becoming electrically charged. In addition, the conductor 56 which is connected between the switch 50 and the resistance $R_g$ and capacitance $C_g$ insures that the slider 24 will also be biased to the +5 volt DC bias voltage shown in FIG. 2. This connection thus prevents any significant voltage difference from developing between the slider 24 and the magnetic disk surface 26. Thus, the elimination of a voltage difference between any conductive element of the read/write head and the magnetic disk surface is insured.

The present invention described and claimed herein is not limited to the particular exemplary read/write head and equivalent circuit shown in FIGS. 1 and 2, but rather may be practiced using a wide variety of read/write head structures and configurations and with many different types of head arm stack assemblies. In addition, and as noted previously, the present invention is not limited in scope to the elimination of only pole-to-disk electrical discharge, and instead is directed to the elimination of any parasitic electrical discharge between any conductive component of the read/write head and the surface of its associated magnetic disk surface.

We claim:

1. Apparatus for operating a disk drive so as to prevent an undesirable electrical discharge between a disk drive pole piece and a magnetic disk surface to which it is coupled, said pole piece and said magnetic disk surface being separated by a predetermined distance to effectively form two plates of a parasitic capacitance capable of sustaining said undesirable discharge; said apparatus comprising means for applying a DC voltage to said pole piece, and means for applying a DC voltage to said magnetic disk surface which is approximately equal to said DC voltage applied to said pole piece and thereby prevents said parasitic capacitance between said pole piece and said magnetic disk surface from charging to a level sufficient to sustain any electrical discharge, wherein a single switch may be used to connect at one terminal thereof to an existing voltage supply terminal for a preamplifier stage which is in turn is connected to said pole piece, and said switch is used to connect at another terminal thereof to said magnetic disk surface, whereby a single voltage supply which is existing and available to operationally bias said preamplifier stage may be used multifunctionally to additionally bias said magnetic disk surface through said single switch, thereby ensuring that said pole piece and said magnetic disk surface are biased at substantially the same electrical potential, whereby either random electrical discharge between said disk and pole piece or local discharge between said disk and pole piece into imperfections on said disk surface have been eliminated.

* * * * *